Dec. 26, 1933.  E. P. LARSH  1,940,957
PUMP UNIT
Filed April 4, 1932
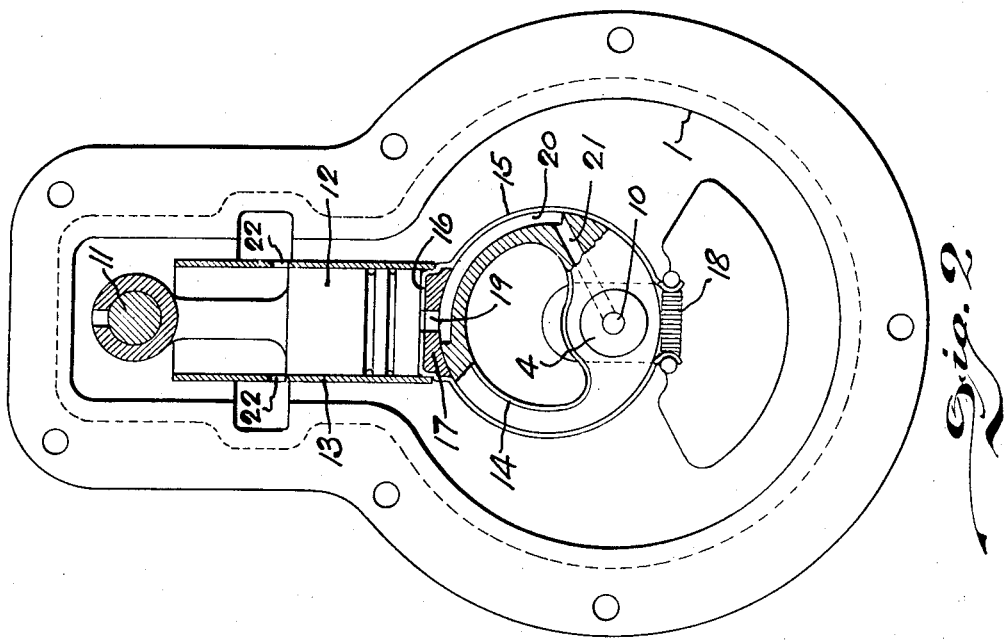
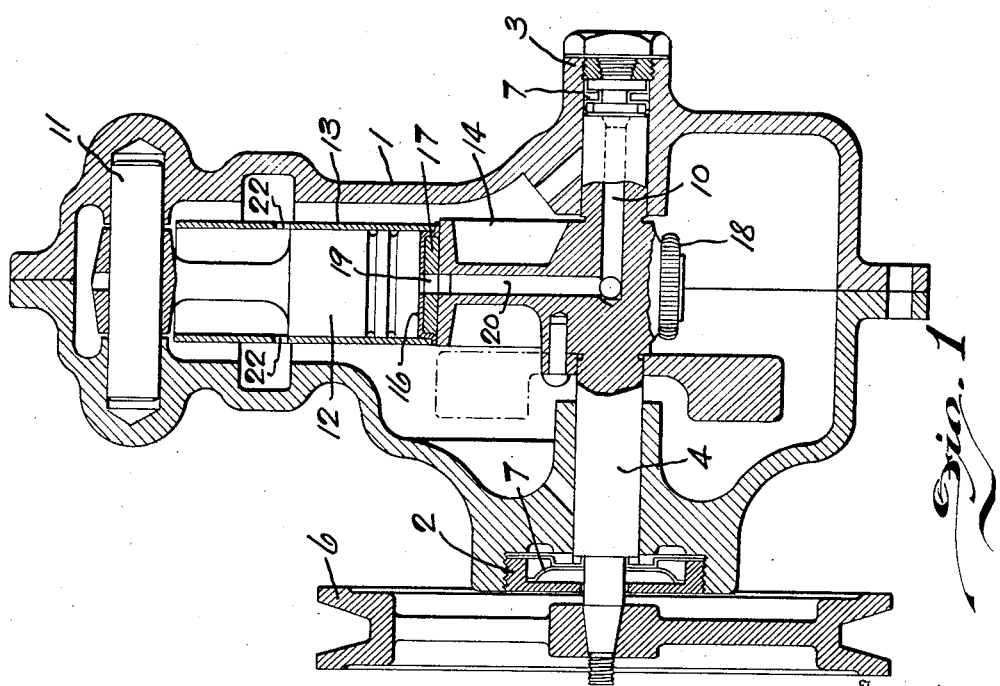
Inventor
Everett P. Larsh
By Walker and Dybvig
Attorneys Patented Dec. 26, 1933

1,940,957

UNITED STATES PATENT OFFICE 1,940,957

PUMP UNIT

Everett P. Larsh, Vandalia, Ohio, assignor to The Master Electric Company, Dayton, Ohio, a corporation of Ohio Application April 4, 1932. Serial No. 603,026

4 Claims. (Cl. 103—159)

This invention relates to pumps and more particularly to air and gas pumps of the reciprocating type, although the apparatus is applicable to pumping liquids.

There is contemplated a construction of few parts and compact form wherein the crank shaft bearing is utilized for opening and closing communication with the cylinder, thus obviating the necessity for other valve parts.

The object of the invention is to simplify the construction as well as the means and mode of operation of pumping mechanisms whereby they will not only be cheapened in construction, but will be more efficient in operation, of compact form, having but few operating parts, uniform in action, and unlikely to get out of repair.

A further object of the invention is to provide an improved form of cylinder and piston mounting wherein the piston is mounted for swinging motion only about a fixed axis while the cylinder is directly connected with the actuating means for combined swinging and reciprocatory motion.

A further object of the invention is to provide an improved form of valve control whereby the crank shaft bearing is utilized duofunctionally as an actuating means and as a cut-off valve controlling the cylinder.

A further object of the invention is to provide an improved self adjusting bearing member coacting with the crank shaft bearing whereby the bearing contact will at all times be maintained liquid tight.

With the above primary and other incidental objects in view, as will more fully appear in the specification, the invention consists of the features of construction, the parts and combination thereof and the mode of operation, or their equivalents, as hereinafter described and set forth in the claims.

In the drawing wherein is shown the preferred, but obviously not necessarily the only form of embodiment of the invention, Fig. 1 is a vertical sectional view through the assembled pump. Fig. 2 is a similar view in a plane at right angles to that of Fig. 1.

Like parts are indicated by similar characters of reference throughout the several views.

Referring to the drawing, 1 is the frame or housing provided with hermetically sealed bearings 2 and 3 for a power shaft 4 upon which is carried a driving pulley 6 or other actuating connection. The bearings 2 and 3 are provided with suitable sealing devices 7. An inlet conduit 8 leads to the interior of the hermetically sealed housing 1, while a discharge conduit 9 leads from the bearing hub 3 where it communicates with one end of the hollow power shaft 4 which has therein an axial passage 10.

Mounted in the top of the housing 1 is a trunnion shaft 11 upon which is suspended a piston 12 free for swinging motion about the fixed axis of the trunnion shaft 11.

Enclosing the piston 12 is a cylinder 13 having direct connection with a crank bearing or eccentric 14 upon the shaft 4.

Surrounding the eccentric 14 is a strap or coacting bearing member 15 which at one side of the eccentric is projected into a hollow boss 16 extending within the end of the cylinder 13 and forming a head therefor. The interior of the boss 16 or cylinder bearing head is filled with bearing metal forming a shoe or thrust bearing 17 engaging the eccentric, at the opposite side of which the ends of the strap are inter-connected. The strap ends are preferably connected by a resilient contractile coupling, such as the spring 18. Obviously other suitable forms of spring means may be employed. Such resilient interconnection of the strap ends affords an automatic take-up which maintains a uniform close contact between the bearing shoe 17 and the eccentric.

A port 19 is provided in the cylinder head 16 and through the shoe 17 where it communicates with the peripheral bearing surface of the eccentric. Provided in the peripheral bearing surface of the eccentric is a segmental groove 20 positioned to register with the port 19 during a portion of the rotary motion of the eccentric. The peripheral groove 20 communicates through a branch passage 21 with the axial bore 10 of the crank shaft 4. Thus during a portion of the rotary motion of the eccentric the cylinder 13 is in direct communication with the discharge conduit 9, through the port 19, groove 20, branch passage 21, and axial bore 10 of the shaft 4. As the shaft and eccentric continue to rotate the groove 20 moves beyond the port 19 thereby causing the port to register with an ungrooved portion of the eccentric bearing surface and hence close the port 19. The peripheral surface of the eccentric becomes in effect a circular slide valve, or rotary valve, for intermittently opening and closing the port 19, in addition to its function of transmitting reciprocatory motion to the cylinder.

The wall of the cylinder 13 is provided with a mid-length lateral port 22, which is opened by the retractive movement of the cylinder to establish communication between the interior of the cylinder and the interior of the sealed housing 1 outside the cylinder. This port 22 comprises the intake port.

As the eccentric approaches dead center at the top of its path of travel, the cylinder head 16 has approached the piston and the contents of the cylinder have been expelled through the port 19 and groove 20 to the passage 21 and axial bore 10. Passing dead center position, the groove 20 travels beyond the port 19, which is thereby closed, and the cylinder begins to recede relative to the piston, producing a partial vacuum within the cylinder until the cylinder has been retracted to such extent as to expose the lateral intake port 22 beyond the head of the piston, whereupon fluid charge is drawn into the cylinder from the surrounding housing 1. Upon return movement of the cylinder by continued rotation of the eccentric, the indrawn charge is compressed within the cylinder, at which moment the groove 20 again comes into registry with the port 19 to permit the discharge of the compressed fluid. The peripheral extent of the groove 20 determines the proportionate interval in the cycle of operation during which the discharge port 19 is maintained open. Likewise, the longitudinal position of the lateral intake port 22 in the cylinder wall determines the interval in the cycle of operation during which the intake port is maintained open, and the proportionate size of the charge.

The construction is capable of being almost entirely made from sheet metal stampings, and hence may be quite economically manufactured.

From the above description it will be apparent that there is thus provided a device of the character described possessing the particular features of advantages before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In a pump, a piston mounted for swinging motion about a fixed pivot, a cylinder within which the piston extends, mounted for reciprocatory motion relative to the piston, a rotary eccentric transmitting motion to the cylinder, a hollow shaft upon which the eccentric is carried, a branch passage through the eccentric communicating with the interior of the hollow shaft and having a port in the bearing surface of the eccentric, said cylinder having therein a port registering with the port in the eccentric during a part of the rotation of the latter whereby intercommunication is intermittently established between the cylinder and the hollow interior of the shaft by the rotation of the eccentric.

2. A pump, including a compression cylinder and a coacting piston, actuating means therefor, including a rotary hollow crank shaft and an eccentric bearing for transmitting relative operating motion to the cylinder and piston, one of which is pivotally mounted for swinging motion, said eccentric crank shaft bearing being peripherally grooved, a passage leading from the groove to the interior passage of the hollow shaft, a port in the corresponding surface of said bearing communicating with the cylinder and registering with said groove during a portion of the rotation of the crank shaft whereby the cylinder is intermittently interconnected with the interior of the hollow shaft.

3. In a pump, a frame, a relatively fixed bearing, a piston mounted thereon for swinging motion, a crank shaft, a cylinder enclosing the piston and connected with the crank shaft for reciprocatory motion relative to the piston, an eccentric bearing upon the crank shaft, an expansible and contractible coacting bearing member connected with the cylinder and enclosing the crank shaft bearing and ports to the cylinder intermittently opened and closed by the operation of the parts.

4. In a pump, a frame, a relatively fixed bearing, a piston mounted thereon for swinging motion, a crank shaft, a cylinder enclosing the piston and connected with the crank shaft for reciprocatory motion relative to the piston, an eccentric bearing upon the crank shaft, an eccentric strap surrounding the bearing, a spring subjecting the strap to contractive tension, and inlet and outlet ports to the cylinder opened and closed by the operation of said parts.

EVERETT P. LARSH.